(12) United States Patent
Gross et al.

(10) Patent No.: US 12,704,240 B2
(45) Date of Patent: Aug. 11, 2026

(54) LOCKING STRUCTURE OF BOWENS MOUNT

(71) Applicant: APUTURE IMAGING INDUSTRIES CO., LTD., Shenzhen (CN)

(72) Inventors: Mitch Gross, Shenzhen (CN); Shuwei Li, Shenzhen (CN); Shaoqin Zheng, Shenzhen (CN); Peng Li, Shenzhen (CN); Daniel Chung, Shenzhen (CN); Anqing Liu, Shenzhen (CN)

(73) Assignee: APUTURE IMAGING INDUSTRIES CO., LTD., Shenzhen (CN)

( * ) Notice: Subject to any disclaimer, the term of this patent is extended or adjusted under 35 U.S.C. 154(b) by 0 days.

(21) Appl. No.: 18/988,935

(22) Filed: Dec. 20, 2024

(65) Prior Publication Data

US 2025/0116393 A1 Apr. 10, 2025

Related U.S. Application Data

(63) Continuation of application No. PCT/CN2022/116184, filed on Aug. 31, 2022.

(51) Int. Cl.
*F21V 17/14* (2006.01)
*F21K 5/06* (2006.01)
(Continued)

(52) U.S. Cl.
CPC .............. *F21V 17/14* (2013.01); *F21V 17/06* (2013.01); *F21V 17/104* (2013.01); *F21V 17/12* (2013.01);
(Continued)

(58) Field of Classification Search
CPC ........ F21V 17/06; F21V 17/104; F21V 17/12; F21V 17/14; F21V 17/16; F21V 17/18;
(Continued)

(56) References Cited

U.S. PATENT DOCUMENTS 1,581,021 A * 4/1926 Russell .................. F21V 17/06 362/438
8,684,569 B2 * 4/2014 Pickard .................. F21V 13/14 362/147
(Continued)

FOREIGN PATENT DOCUMENTS

CN 104566234 A * 4/2015 .............. F21K 9/20

OTHER PUBLICATIONS

Machine translation of CN-104566234-A retrieved from the FIT database of PE2E search. (Year: 2025).*
(Continued)

*Primary Examiner* — Colin J Cattanach

(57) ABSTRACT

A locking structure of a Bowens mount, configured to lock a luminaire with an optical accessory having a Bowens mount, including a rotating member and a mount provided on a luminaire front housing, in which the mount is provided on a peripheral side of a light outlet aperture of the luminaire front housing, the rotating member is threaded to the mount, the mount includes three grooves fitted with protrusions of the Bowens mount, a height of each groove is lower than that of each protrusion of the Bowens mount, and the rotating member includes notch parts corresponding to at least three grooves.

9 Claims, 3 Drawing Sheets

(51) Int. Cl.

| | |
|---|---|
| ***F21V 17/06*** | (2006.01) |
| ***F21V 17/10*** | (2006.01) |
| ***F21V 17/12*** | (2006.01) |
| ***F21V 17/16*** | (2006.01) |
| ***F21V 17/18*** | (2006.01) |
| ***F21V 17/20*** | (2006.01) |
| ***G03B 15/02*** | (2021.01) |
| ***G03B 15/04*** | (2021.01) |
| ***G03B 15/06*** | (2021.01) |
| ***G03B 15/07*** | (2021.01) |

(52) U.S. Cl.
CPC ............... *F21V 17/16* (2013.01); *F21V 17/18* (2013.01); *F21V 17/20* (2013.01); *G03B 15/02* (2013.01); *G03B 15/0442* (2013.01); *G03B 15/0484* (2013.01); *G03B 15/06* (2013.01); *G03B 15/07* (2013.01)

(58) Field of Classification Search
CPC ..... F21V 17/20; G03B 15/02; G03B 15/0442; G03B 15/0484; G03B 15/06; G03B 15/07
See application file for complete search history.

(56) References Cited

U.S. PATENT DOCUMENTS

| | | | | |
|---|---|---|---|---|
| 9,068,725 | B1* | 6/2015 | Kuykendall | F21V 1/26 |
| 2012/0236559 | A1* | 9/2012 | Sachsenweger | F21V 7/04 362/235 |
| 2012/0236563 | A1* | 9/2012 | Breidenassel | F21V 17/14 362/249.02 |

OTHER PUBLICATIONS

International Search Report of PCT Patent Application No. PCT/CN2022/116184 issued on May 31, 2023.

* cited by examiner

LOCKING STRUCTURE OF BOWENS MOUNT

CROSS-REFERENCE TO RELATED APPLICATIONS

The present disclosure is a Continuation Application of PCT Application No. PCT/CN2022/116184 filed on Aug. 31, 2022. All the above are hereby incorporated by reference in their entirety.

TECHNICAL FIELD

The present disclosure relates to the technical field of optical apparatus and, particularly, to a locking structure of a Bowens mount.

BACKGROUND

Bowens mount is a standard mechanical interface commonly used in film and television luminaire. It is used to install and adjust various optical accessories that change an angle of light, including but not limited to, such as reflectors, spherical soft boxes, umbrella soft boxes, focusing lenses, and imaging lenses. Film and television luminaire is often composed of two parts. The first part is a light source, which is a lamp part, configured to produce a light beam. The second part is an optical accessory mounted on the lamp, configured to modify an angle and direction of the light beam. For example, a reflector is able to constrict a wide-angle light beam into a narrow one, increasing the intensity at the center of the light spot. A softbox is configured to diffuse the light beam, so that the light is evenly distributed over the object being illuminated. Bowens mount is a mechanical interface commonly used at optical accessory ends. In order to be compatible with optical accessories with a Bowens mount, the luminaire mount typically employs a common mount structure, and the optical accessory is locked to the luminaire via the cooperation of the Bowens mount and the mount structure.

SUMMARY

Provided in the present disclosure is a locking structure of a Bowens mount, configured to lock a luminaire with an optical accessory having a Bowens mount, including a rotating member and a mount provided on a luminaire front housing, in which the mount is provided on a peripheral side of a light outlet aperture of the luminaire front housing, the rotating member is threaded to the mount, the mount includes three grooves fitted with protrusions of the Bowens mount, a height of each groove is lower than that of each protrusion of the Bowens mount, and the rotating member includes at least three notch parts corresponding to the grooves.

Figure 1:
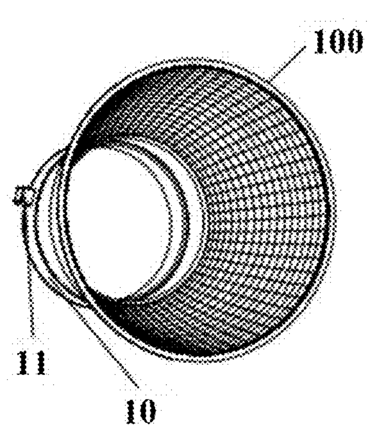
FIG. 1 is a schematic structural diagram of an optical accessory in the prior art.

The meanings of the reference numerals are as follows: 10 Bowens mount; 11 protrusion; 20 recess; 21 spring clip; 30 luminaire front housing; 31 light outlet aperture; 32 mount; 321 outer ring; 322 connecting part; 323 inner ring; 324 groove; 325 inner thread; 40 rotating member; 41 outer threaded; 42 notch part; 43 rotating handle; 50 limit fixed starting point; 60 limit fixed ending point; 100 optical accessory; 200 luminaire.

DETAILED DESCRIPTION

An objective of the present disclosure is to provide a locking structure of a Bowens mount, addressing the technical problem that the luminaire mount structure of the prior art that is compatible with a Bowens mount is only capable of fixing optical accessories quite loosely.

In order to solve the aforementioned technical problems, the following technical solutions are adopted in the present disclosure.

In some embodiments, the mount includes an inner ring and an outer ring that are coaxial with and parallel to the light outlet aperture, and a connecting part that connects the inner ring and the outer ring, the inner ring is proximal to the light outlet aperture, the outer ring is distal to the light outlet aperture, and the connecting part is vertically connected to an inner end of the outer ring and an outer end of the inner ring, respectively.

In some embodiments, a side of the outer ring facing the light outlet aperture of the luminaire front housing is provided with an inner thread, and the groove is provided on the connecting part.

In some embodiments, the rotating member includes a rotating body in a shape of a ring, an outer periphery of the rotating body is provided with an outer thread fitted with the inner thread, and an inner periphery of the rotating member is provided with the notch parts.

In some embodiments, the rotating member is provided with a rotating handle configured to operate the rotating member to rotate.

In some embodiments, two rotating handles are provided on the rotating member, respectively.

In some embodiments, a limit fixed starting point and a limit fixed ending point both provided on the luminaire front housing and located on a peripheral side of the mount, the rotating handle is provided between the limit fixed starting point and the limit fixed ending point, so as to limit a movement distance of the rotating handle by means of the limit fixed starting point and the limit fixed ending point, so that a vertical displacement of the rotating member is limited.

In some embodiments, the limit fixed starting point is provided corresponding to one of the grooves, and the rotating handle is provided corresponding to one of the notch parts.

In some embodiments, a distance between the limit fixed starting point and the limit fixed ending point is set according to a vertical displacement of the rotating member, that allows to press against the protrusions with different heights.

In view of the technical solutions mentioned above, the present disclosure provide at least the following advantages and positive effects.

Provided in the present disclosure is a locking structure of a Bowens mount, configured to lock a luminaire with an optical accessory having a Bowens mount, including a rotating member and a mount provided on a luminaire front housing, in which the mount is provided on a peripheral side of a light outlet aperture of the luminaire front housing, the rotating member is threaded to the mount, the mount includes three grooves fitted with protrusions of the Bowens mount, a height of each groove is lower than that of each protrusion of the Bowens mount, and the rotating member includes notch parts corresponding to the at least three grooves. The protrusion of the Bowens mount enters the groove of the mount through the notch part of the rotating member, and the groove limits a circumference of the protrusion. The threaded fit between the rotating member and the mount misaligns the notch part and the groove, and compresses the protrusion to limit a vertical movement of the protrusion.

A typical embodiment that embodies the features and advantages of the present disclosure is described in detail in the following description. It should be understood that various changes may be made to the present disclosure in different embodiments, all of which fall within the scope of the present disclosure, and the descriptions and illustrations thereof are intended to be used essentially for illustrative purposes and not for limiting the present disclosure.

Figure 2:
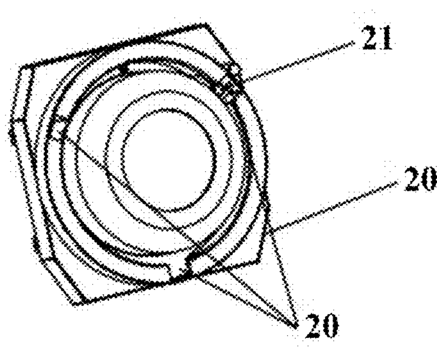
FIG. 2 is a schematic structural diagram of a luminaire mount in the prior art.
Figure 4:
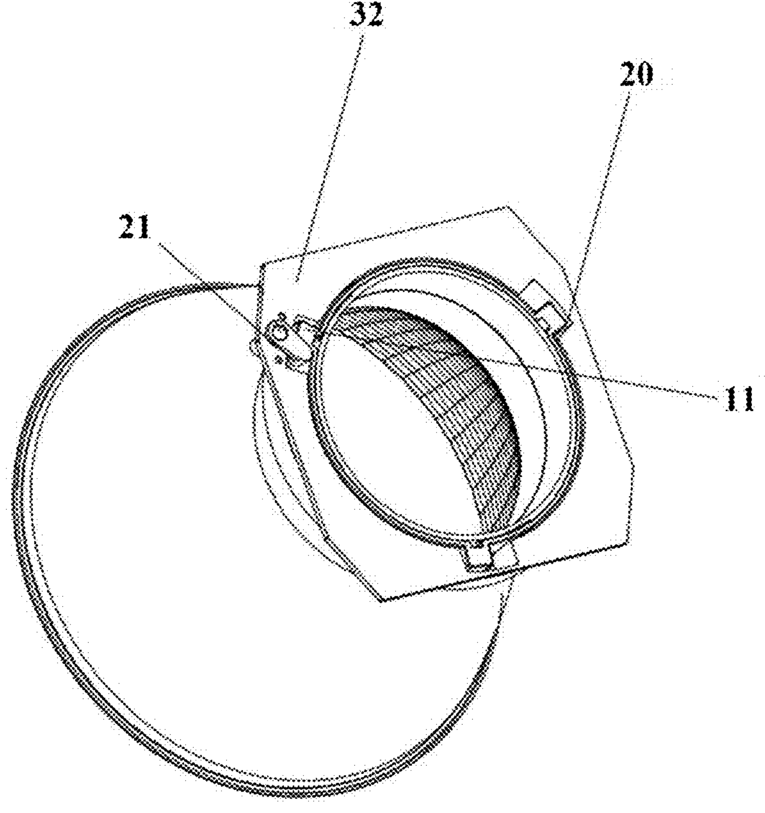
FIG. 4 is a schematic structural diagram in another view of a cooperation between the optical accessory and the luminaire mount in the prior art.

A brief introduction to the Bowens mount 10 is provided before describing in detail the present disclosure. FIG. 1 is a schematic structural diagram of the Bowens mount 10 of the prior art. As shown in FIG. 1, Bowens mount 10 is a mechanical interface commonly used at an end of an optical accessory 100, and includes a ring with three protrusions 11 made of metal. As shown in FIG. 2, in order to be compatible with the optical accessory 100 having a Bowens mount 10, film and television luminaire often employs a common mount 32 structure. The mount 32 structure includes three recesses 20 fitted with three protrusions 11 of the Bowens mount 10. The three recesses 20 are concentric arc-shaped grooves 324, so that the protrusions 11 are able to rotate along the recesses 20 until the recesses 20 are covered by a luminaire front housing so as to be limited by the luminaire front housing when rotating the Bowens mount 10, due to the other part of the recess 20 being covered by the front housing of the film and television lighting after the protrusions 11 of the Bowens mount 10 are inserted into the respective slots of each recess 20. As shown in FIG. 4, also, a spring clip 21 is provided in the recess 20 to prevent the protrusion 11 from continuing to rotate, so as to lock the Bowens mount 10 and thus clamp the optical accessory 100 to the film and television lighting. A pin that controls the spring clip 21 is pressed to retract the spring clip 21, and then the optical accessory 100 is rotated to be removed in an opposite direction.

Figure 3:
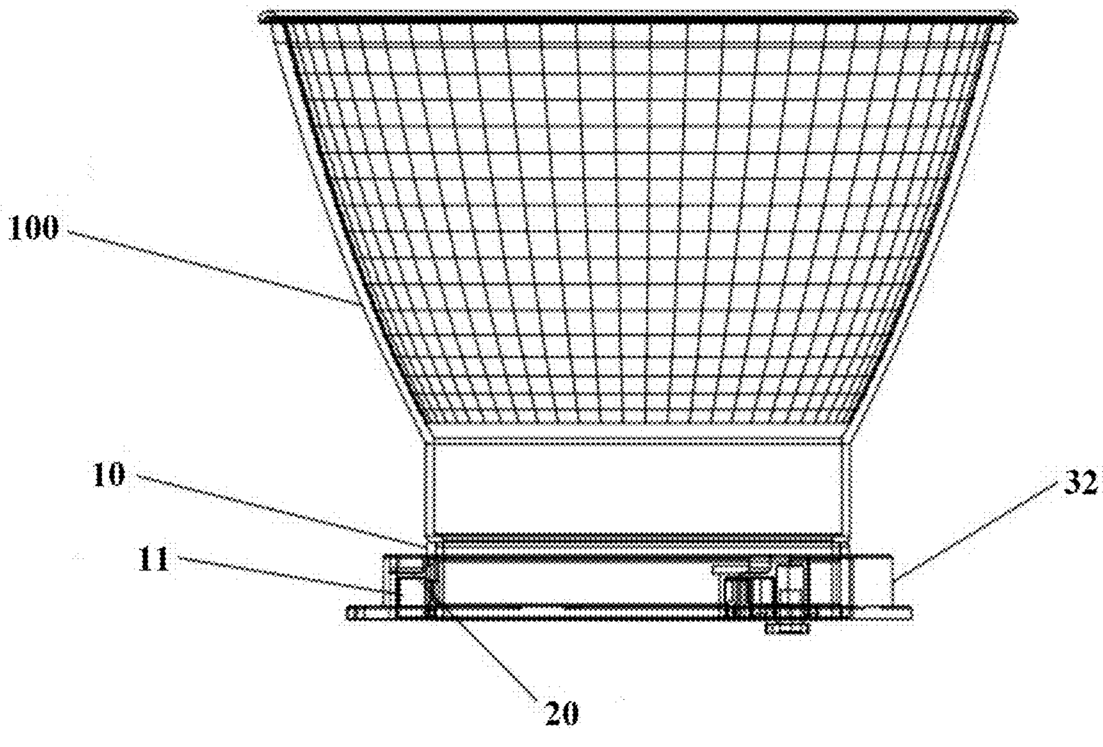
FIG. 3 is a schematic structural diagram of a cooperation between the optical accessory and the luminaire mount in the prior art.

In the prior art, the fit between the recesses 20, the spring clip 21, and the front housing only serves to fix the optical accessory 100, which is relatively light and has no complex optical structure. The solution of the Bowens mount 10 for locking of the prior art is not precise enough for correct optical alignment when fixing a larger, heavier and more complex optical accessory 100. The strength of the spring clip 21 is also too weak to lock the heavy optical accessory 100, which contains large-scale glass and metal parts, resulting in a large amount of movement of the optical accessory 100 in the direction of rotation. As shown in FIG. 3, also, differences in the dimensions of the Bowens mount 10 produced by various optical accessory manufacturers may result in inconsistent heights of the three protrusions 11. In order to avoid a protruding metal structure that is too high causing the optical accessory 100 to be unable to be mounted, the luminaire manufacturer is only able to produce the recess 20 at the end of the luminaire 200 as high as possible in the groove 324, which allows most of the optical accessory 100 to still have space to move vertically.

Figure 5:
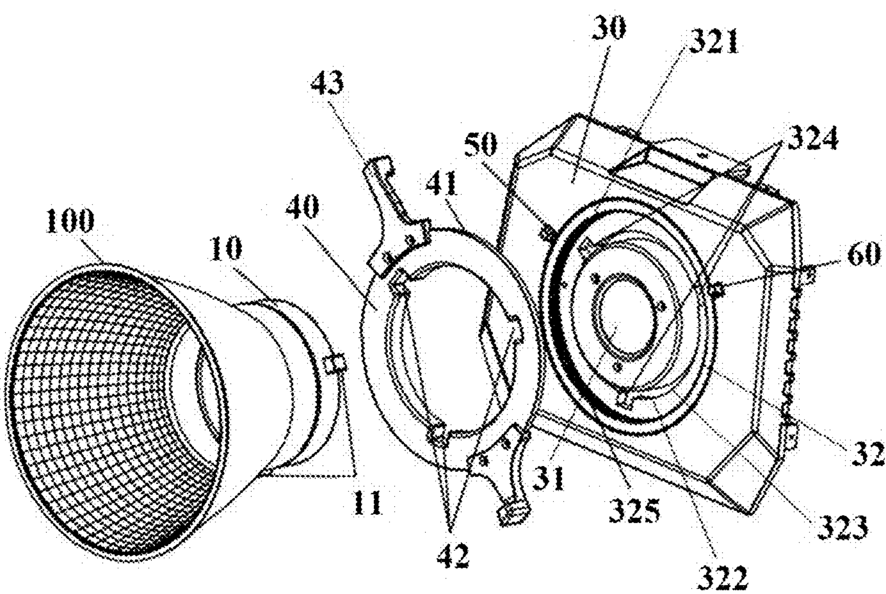
FIG. 5 is an overall schematic structural diagram of a locking structure provided in the present disclosure.
Figure 6:
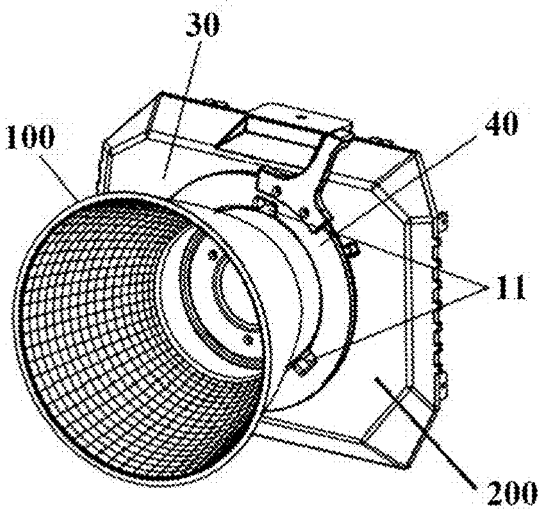
FIG. 6 is a schematic structural diagram of the use of the locking structure provided in the present disclosure.

Referring to FIGS. 5 and 6, provided in the present disclosure is a locking structure of a Bowens mount, which eliminates both a rotational clearance and a vertical clearance between the Bowens mount 10 of the optical accessory 100 and the mount 32 of the luminaire 200. The Bowens mount 10 includes a rotating member 40 and a mount 32 provided on the luminaire front housing 30.

For facilitating description and understanding, it is hereby defined that an axial direction of the light outlet aperture 31 of the luminaire front housing 30 in FIG. 5 is a vertical direction, and an inner or outer side of the luminaire front housing 30 is an inner or outer direction.

The luminaire front housing 30 is provided with a light outlet aperture 31 allowing the light of the luminaire 200 to pass through, and the mount 32 is provided on a peripheral side of the light outlet aperture 31. The mount 32 is a stepped groove in a shape of a ring, including an inner ring 323 proximal to the light outlet aperture 31, an outer ring 321 distal to the light outlet aperture 31, and a connecting part 322 connecting between the outer ring 321 and the inner ring 323.

The inner ring 323 and the outer ring 321 are coaxial with and parallel to the light outlet aperture 31, and the connecting part 322 is vertically connected to an inner end of the outer ring 321 and an outer end of the inner ring 323. Specifically, the luminaire front housing 30 extends vertically inwards to form the outer ring 321, then extends vertically towards the light outlet aperture 31 to form the connecting part 322, and extends vertically inwards on a peripheral side proximal to the light outlet aperture 31 to form the inner ring 323. In such an arrangement, the mount 32 is shaped a stepped groove. A side of the outer ring 321 facing the light outlet aperture 31 is provided with an inner thread 325. The connecting part 322 is provided with grooves 324 that are fitted with the three protrusions 11 of the Bowens mount 10, and the size of each of the grooves 324 is able to restrict a movement of each of the protrusions 11 in a peripheral direction of the mount 32. Also, a height of each groove 324 is lower than that of each protrusion 11.

The rotating member 40 is a ring provided coaxially with the mount 32, and a center of the rotating member 40 is able to allow the Bowens mount 10 of the optical accessory 100 to pass through. An outer periphery of the rotating member 40 is provided with an outer thread 41, and an inner periphery of the rotating member 40 is provided with a notch part 42. The rotating member 40 is fitted with the inner thread 325 of the outer ring 321 of the mount 32 by means of the outer thread 41, so as to achieve the threaded connection between the rotating member 40 and the mount 32. Specifically, in the present embodiment, there are three notch parts 42, each of the three notch parts 42 corresponds to each of the three grooves 324. In other embodiments, there may be more than three notch parts 42, as long as there are at least three notch parts 42 corresponding to the three grooves 324.

When in use, the rotating member 40 is rotated into the mount 32 until the notch parts 42 are aligned with the grooves 324, and the Bowens mount 10 of the optical accessory 100 passes through the center of the rotating member 40, so that three protrusions 11 enters into the grooves 324 through the notch parts 42. Then, the protrusions 11 are limited in peripheral movement by the grooves 324. In such an arrangement, the rotating member 40 is rotated, so that the notch parts 42 on the rotating member 40 are misaligned with the grooves 324, and the threaded fit is continued to be tightened. Since a height of each of the protrusions 11 is higher than that of each of the grooves 324, the rotating member 40 is rotated to a surface of the protrusion 11 and presses against the protrusion 11, so as to eliminate the clearance between the rotating member 40 and the protrusion 11. In such an arrangement, the grooves 324 and the rotating member 40 limit the movement of the Bowens mount 10 in a peripheral direction and a vertical direction respectively, ensuring the reliability of the installation.

Further, the rotating member 40 is provided with a rotating handle 43 configured to operate the rotating member 40 to rotate. The rotating handle 43 may be fixed to an outer periphery of the rotating member 40 or may be in a detachable connection with an outer periphery of the rotating member 40. Specifically, two rotating handles are provided on the rotating member, respectively. It is to be understood that the number of the rotating handles 43 may be set as required.

Further, the locking structure further includes a limit fixed starting point 50 and a limit fixed ending point 60 both provided on the luminaire front housing 30 and located on an outer periphery of the mount 32. The rotating handle 43 is provided between the limit fixed starting point 50 and the limit fixed ending point 60, so as to limit a movement distance of the rotating handle 43 by means of the limit fixed starting point 50 and the limit fixed ending point 60, so that a vertical displacement of the rotating member 40 is limited.

Specifically, the limit fixed starting point 50 is provided corresponding to one of the grooves 324, and the rotating handle 43 is provided corresponding to one of the notch parts 42. A distance between the limit fixed starting point and the limit fixed ending point is set according to a vertical displacement of the rotating member, that allows to press against the protrusions with different heights. When in use, the rotating handle 43 is turned clockwise to lock the luminaire 200 with the optical accessory 100 having a Bowens mount 10. The rotating handle 43 is turned counterclockwise so that the rotating handle 43 and its corresponding notch part 42 are turned to the position where the limit fixed starting point 50 and its corresponding groove 324 are located, thus causing the notch part 42 to overlap the groove 324. Meanwhile, the rotating handle 43 is continued to be rotated counterclockwise to unlock the rotating member 40 by rotating in an opposite direction.

Provided in the present disclosure is a locking structure of a Bowens mount 10, configured to lock the luminaire 200 with the optical accessory 100 having a Bowens mount 10, including a rotating member 40 and a mount 32 provided on the luminaire front housing 30. The mount 32 includes three grooves fitted with the protrusions 11 of the Bowens mount 10 and an inner thread 325 provided in the mount 32. A height of each of the grooves 324 is lower than that of each of the protrusions 11 of the Bowens mount 10. The rotating member 40 includes a rotating member body, notch parts 42, corresponding to at least three grooves 324, provided on the rotating member body, and an outer thread 41 provided on an outer periphery of the rotating member body. The mount 32 is in threaded connection with the rotating member 40 by means of the inner thread 325 and the outer thread 41. Each of the protrusions 11 of the Bowens mount 10 enters the corresponding groove 324 of the mount 32 through the corresponding notch part 42 of the rotating member 40, and the groove 324 limits a circumference of the protrusion 11. The threaded fit between the rotating member 40 and the mount 32 misaligns the notch parts 42 and the grooves 324, and compresses the protrusions 11 to limit a vertical movement of the protrusions 11. The locking structure provided in the present disclosure eliminates any loosening of the connection point between the luminaire 200 and the Bowens mount 10 of the optical accessory 100. On the one hand, it allows the film and television luminaire to be installed with heavier optical accessories that will not fall off, and on the other hand, it ensures an accurate connection between the optical accessories, such as complex lens assemblies, and the light source of the luminaire, thereby ensuring optical quality.

Although the present disclosure has been described with reference to several exemplary embodiments, it should be understood that the terminology used is illustrative and exemplary and not limiting. Since the present disclosure may be implemented in many forms without departing from the spirit or essence of the present disclosure, it should be understood that the above implementations are not limited to any of the preceding details, but should be interpreted broadly within the spirit and scope defined by the appended claims. Therefore, all variations and modifications that fall within the scope of the claims or their equivalents shall be covered by the appended claims.

The invention claimed is:

1. A locking structure of a Bowens mount, configured to lock a luminaire with an optical accessory having a Bowens mount, comprising a rotating member and a mount provided on a luminaire front housing, wherein the mount is provided on a peripheral side of a light outlet aperture of the luminaire front housing, the rotating member is threaded to the mount, the mount comprises three grooves fitted with protrusions of the Bowens mount, a height of each groove is lower than that of each protrusion of the Bowens mount, and the rotating member comprises notch parts corresponding to the at least three grooves.

2. The locking structure according to claim 1, wherein the mount comprises an inner ring and an outer ring that are coaxial with and parallel to the light outlet aperture, and a connecting part that connects the inner ring and the outer ring, the inner ring is proximal to the light outlet aperture, the outer ring is distal to the light outlet aperture, and the connecting part is vertically connected to an inner end of the outer ring and an outer end of the inner ring, respectively.

3. The locking structure according to claim 2, wherein a side of the outer ring facing the light outlet aperture of the luminaire front housing is provided with an inner thread, and the grooves are provided on the connecting part.

4. The locking structure according to claim 3, wherein the rotating member comprises a rotating body in a shape of a ring, an outer periphery of the rotating body is provided with an outer thread fitted with the inner thread of the mount outer ring, and an inner periphery of the rotating member is provided with the notch parts.

5. The locking structure according to claim 4, wherein the rotating member is provided with a rotating handle configured to operate the rotating member to rotate.

6. The locking structure according to claim 5, wherein two rotating handles are provided on the rotating member, respectively.

7. The locking structure according to claim 5, further comprising a limit fixed starting point and a limit fixed ending point both provided on the luminaire front housing and located on a peripheral side of the mount, the rotating handle is provided between the limit fixed starting point and the limit fixed ending point, so as to limit a movement distance of the rotating handle by means of the limit fixed starting point and the limit fixed ending point, so that a vertical displacement of the rotating member is limited.

8. The locking structure according to claim 7, wherein the limit fixed starting point is provided corresponding to one of the grooves, and the rotating handle is provided corresponding to one of the notch parts.

9. The locking structure according to claim 8, wherein a distance between the limit fixed starting point and the limit fixed ending point is set according to a vertical displacement of the rotating member, wherein the vertical displacement allows the rotating member to press against the protrusions.

* * * * *